(12) United States Patent
Burns

(10) Patent No.: US 7,071,686 B1
(45) Date of Patent: Jul. 4, 2006

(54) MAGNETIC LIQUID CRYSTAL DISPLAY

(75) Inventor: Alan Alexander Burns, Portola Valley, CA (US)

(73) Assignee: MLHO, Inc., Portola Valley, CA (US)

(*) Notice: Subject to any disclaimer, the term of this patent is extended or adjusted under 35 U.S.C. 154(b) by 281 days.

(21) Appl. No.: 10/673,599

(22) Filed: Sep. 29, 2003

Related U.S. Application Data

(62) Division of application No. 09/927,736, filed on Aug. 10, 2001, now Pat. No. 6,647,771.

(60) Provisional application No. 60/228,941, filed on Aug. 30, 2000.

(51) Int. Cl.
*G01R 33/02* (2006.01)
(52) U.S. Cl. .................. 324/244; 264/1.31
(58) Field of Classification Search .............. 73/146; 324/244; 264/1.31
See application file for complete search history.

(56) References Cited

U.S. PATENT DOCUMENTS

| | | | |
|---|---|---|---|
| 3,807,232 A | 4/1974 | Wetterhorn | |
| 3,876,286 A | 4/1975 | Deutscher et al. | |
| 4,114,990 A | 9/1978 | Mash et al. | |
| 4,128,496 A | 12/1978 | Cole et al. | |
| 4,214,819 A | 7/1980 | Pohl et al. | |
| 4,581,579 A * | 4/1986 | Nagatsuma et al. | 324/244.1 |
| 4,768,862 A | 9/1988 | McAdams | |
| 4,896,103 A | 1/1990 | Shimanuki | |
| 5,412,500 A | 5/1995 | Fergason | |
| 5,798,807 A | 8/1998 | Prehn | |
| 6,499,353 B1 | 12/2002 | Douglas et al. | |
| 6,520,006 B1 | 2/2003 | Burns | |
| 2003/0090012 A1 * | 5/2003 | Allen et al. | 264/1.31 |

* cited by examiner

*Primary Examiner*—Edward Lefkowitz
*Assistant Examiner*—Andre Allen

(57) ABSTRACT

A magneto-optical liquid crystal display responds to the direction of a provided magnetic field. Display alternatives include a compass-like dial indication of direction, numeric values, and complex pixilated images. By providing a variable magnetic field, the display may be used as a non-contact remote analog gauge or digital indicator.

17 Claims, 3 Drawing Sheets

4

MAGNETIC LIQUID CRYSTAL DISPLAY

CROSS-REFERENCES TO RELATED APPLICATIONS

This application is a division of U.S. patent application Ser. No. 09/927,736 filed Aug. 10, 2001, now U.S. Pat. No. 6,647,771 B2 issued Nov. 18, 2003 entitled 'EXTERNAL PRESSURE DISPLAY FOR VEHICLE TIRES', and a continuation of the original parent U.S. Provisional Patent Application Ser. No. 60/228,941 filed Aug. 30, 2000." Accordingly, all benefits, including, but not limited to priority and filing dates that may accrue to this application pursuant 35 U.S.C. §§ 119, 120, & 121 are claimed.

STATEMENT REGARDING FEDERALLY SPONSORED RESEARCH OR DEVELOPMENT

Not applicable.

BACKGROUND

Field of Invention

Use of an indicator dial responsive to the direction of a magnetic field to report the value of a quantity is well known. U.S. Pat. No. 3,807,232 to Wetterhorn describes a magnetically-coupled pressure readout based on Bourdon-tube and conventional magnetic compass principles. U.S. Pat. No. 6,499,353 to Douglas, et al, discloses a virtually identical apparatus to that of Wetterhorn.

U.S. Pat. No. 6,520,006 to Burns describes means alternative to Bourdon tubes for rotating a "sender" magnet in response to pressure stimulus. Burns also discloses readout means alternative to magnetic compasses including arrays of magnetoresistive and Hall-effect sensors as well as induction coils in situations where the "sender" magnet as a whole moves past a pickup sensor, such as in automotive tire pressure sensing application.

U.S. Pat. No. 3,876,286 to Deutscher et al. describes orienting nematic liquid crystals in response to electric and magnetic fields and hence affecting light transmission in electrically controlled liquid crystal cells. U.S. Pat. No. 4,128,496 to Cole et al. describes various dichroic liquid crystal compositions for use in displays.

U.S. Pat. No. 5,412,500 to Fergason describes a method for continuously rotating the direction of linearly polarized light by a liquid crystal cell in response to an electrical input across the cell. This type of device employs quarter wave phase retardation means and a polarization analyzer to effect polarization rotation and requires monochromatic light. The degree of polarization rotation is controlled by the strength of the electrical field, which has a fixed direction.

U.S. Pat. No. 5,798,807 to Prehn proposes a multi-element device for projecting temporally modulated images. In this type of device the degree of polarization rotation is controlled by the strength of the electrical, magnetic, or mechanical impetus, not the orientation of the impetus.

U.S. Pat. No. 4,114,990 to Mash et al. describes a cell filled with a cholesteric (i.e., chiral nematic) liquid crystal for rotating the polarization of incident plane light in response to an electrical field applied transversely across the cell. A simulated pointer meter is to be produced by progressively varying the orientation of a polarizing layer over the cell. This type of device depends on controlling (by means of the electric field strength) the balance between homeotropic alignment of the liquid crystal at one inner cell surface and parallel homogeneous alignment at the other inner cell surface, which affects the degree of helical twist of the cholesteric liquid crystal.

U.S. Pat. No. 4,768,862 to McAdams describes a liquid crystal cell employing a uniform transverse magnetic field to switch the linear polarization orientation of an incident light beam in a wavelength selective fashion. In this type of devic, the orientation of the liquid crystal director is switched from twisted nematic to homeotropic by increasing the strength of the transverse magnetic field.

U.S. Pat. No. 4,214,819 to Pohl et al. proposes using a combination of electric and magnetic fields to increase the switching speed of an electro-optical liquid crystal cell and controlling the color of a display. This type of device uses predetermined electric and magnetic field directions and is controlled by varying the electric filed strength.

SUMMARY

The invented magnetically magneto-optical liquid crystal display exploits the magneto-optical effects of liquid crystals to indicate direction of the magnetic field at the display. This magnetic field may be provided by a remote sender unit responding to mechanical stimulus such as pressure or to other means for changing or controlling the direction of a magnetic field at the display. Thus the value of a physical or other quantity may be displayed. The provided magnetic field may also be natural, such as the geomagnetic field.

The magneto-optical liquid crystal display unit preferably is a thin, flexible patch comprising a liquid crystal cell, and is positioned such that the provided magnetic field has a substantial component in the plane of the cell. Individual pixels comprising the display have predetermined light transmission properties different from one another. The display unit provides a continuous response indicating direction of a vector sum of the magnetic fields across the display as a whole at any particular location and time.

Objects and Advantages

An important advantage of invented magneto-optical liquid crystal display is that it has no moving parts.

Another important advantage is that the invented magneto-optical liquid crystal display is totally passive, requiring no power to display a quantity or to form an image.

Yet another important advantage is that the invented magneto-optical liquid crystal display responds globally, to the provided magnetic field applied across the display, which permits production of successive complex images in response to simple stimuli.

Thus a further advantage is that the invented magneto-optical liquid crystal display may act as its own, passive, analog-to-digital converter.

Another advantage relates both to the ease and accuracy of precisely controlling and then sensing magnetic field direction with magneto-optical liquid crystals as opposed to sensing and parameterizing flux or strength of a magnetic field.

An important advantage is that the invented magneto-optical liquid crystal display can be produced at very low cost.

Other significant advantages of the invented magneto-optical liquid crystal display are simplicity and robustness.

Yet other significant advantages of the invented magneto-optical liquid crystal display relate to its thin profile, small size, and light weight.

Another advantage of the invented magneto-optical liquid crystal display relates to mechanical flexibility and ability to bend with and conform to complex surfaces.

A related advantage of the invented magneto-optical liquid crystal display relates to gluing or bonding the display to surfaces.

Still another advantage of the invented magneto-optical liquid crystal display relates to the capability for employing ambient light.

A particular utility of the invented magneto-optical liquid crystal display is in magnetically-coupled pressure gauges, where dangerously low pressure of tires, particularly of the wheels of large trucks and aircraft, can be easily determined by visual inspection, rather than measurement, substantially enhancing safety.

Other aspects of the invented magneto-optical liquid crystal display relate to economical, direct, non-contaminating pressure and internal temperature indicators in hazardous environments.

Still other aspects of the invented magneto-optical liquid crystal display are associated with a passive display accomplished by prior orientation of pixels of magneto-optical liquid crystal display for placement within an external magnetic field that changes direction responsive to pressure or other transduced property within a closed vessel.

Other features of the invented magneto-optical liquid crystal display is that the display responding to the magnetic field can be essentially independent of the wavelength of the light. On the other hand, the display can respond to magnetic field direction with changes in color. Color changes may provide warning or hazard indications.

Still other features of the invented magneto-optical liquid crystal display relate to mechanisms for precise control of liquid crystal display systems with a magnetic field.

The invented magneto-optical liquid crystal display may be used as an inexpensive flexible magnetic compass permanently bonded to maps and charts to indicate North orientation and as part of novelty items.

Still further objects and advantages will become apparent from a consideration of the ensuing description and accompanying drawings.

DRAWING FIGURES

Reference Numerals In The Drawings

Figure 1:
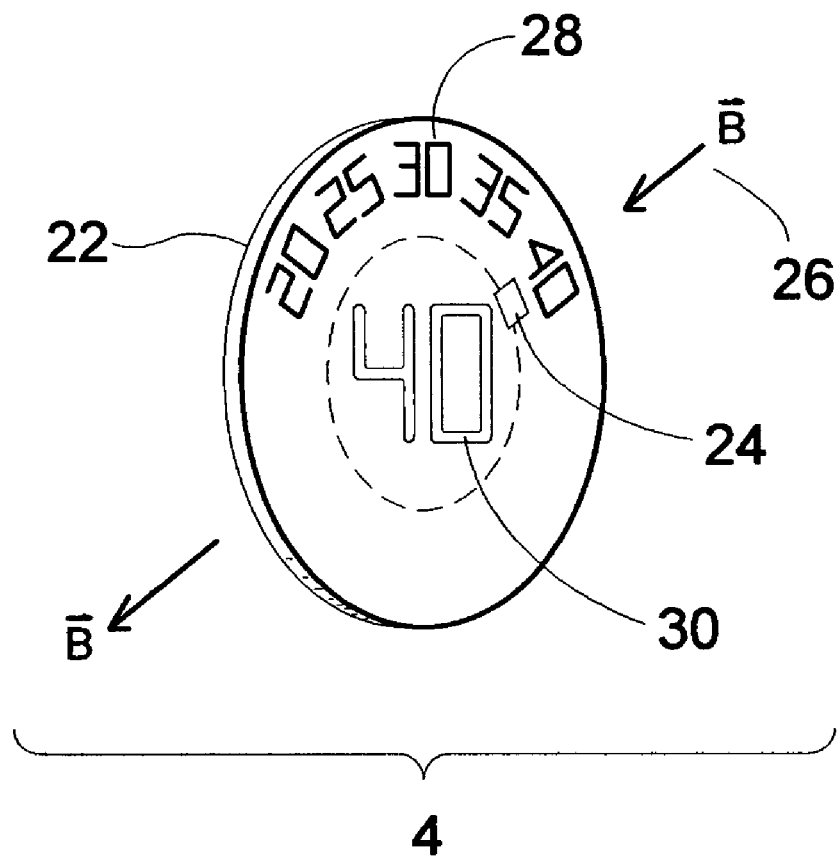
FIG. 1 is a perspective view of a thin magneto-optical display.

| | | | |
|---|---|---|---|
| 4 | display unit | 22 | thin optical structure |
| 24 | virtual pointer | 26 | magnetic field |
| 28 | dial scale | 30 | display symbol |
| 40 | reflecting layer | 42 | polarizing layer |
| 44 | center layer with liquid crystal | 46 | polarizing regions or pixels |
| 48 | incident and reflected light | 50 | polarizer orientation |
| 52 | liquid crystal | 54 | magnetic field vector |
| 56 | first polarizing layer | 58 | center layer with liquid crystal |
| 60 | second polarizing layer | 62 | reflecting layer |
| 64 | liquid crystal | 66A | liquid crystal director |

Reference Numerals In The Drawings

| | | | |
|---|---|---|---|
| 66B | liquid crystal director | 68 | polarizing pixels |
| 70 | incident and reflected light | 72A–B | linear polarizer orientation |
| 76 | magnetic field vector | | |

DESCRIPTION

Preferred Embodiment

FIG. 1 shows a thin-film, conformal, magnetically coupled pressure display unit 4. Display unit 4 is comprised of a thin optical structure 22 whose light transmission and/or reflection properties respond to the direction of an external magnetic field 26. One display possibility is a virtual pointer 24 that rotates with the direction of the magnetic field 26 in the plane of display unit 4 to indicate a quantity related to magnetic field direction as marked on dial scale 28. Virtual pointer 24 is a segment of optical structure 22 with greater or lesser light transmission than the average over the structure. An alternative display approach is to make the dial scale markings themselves more or less transmissive as the component of the magnetic field 26 in the plane of display unit 4 rotates, so that the marking corresponding to a quantity related to the direction of magnetic field 26 is the only one visible. A further display alternative is to cause all or part of the display to change color. A color-changing display can indicate dangerously low or high pressure in a pressure display, for example. A visible pressure display symbol 30 can be made to change as the magnetic field rotates in response to pressure changes. This may be accomplished by segmenting symbol 30 into pixels or regions with varying polarization direction properties. While FIG. 1 illustrates several types of displays, a combination of displays, including all those shown or suggested in FIG. 1, and the above description may be used simultaneously.

Figure 2:
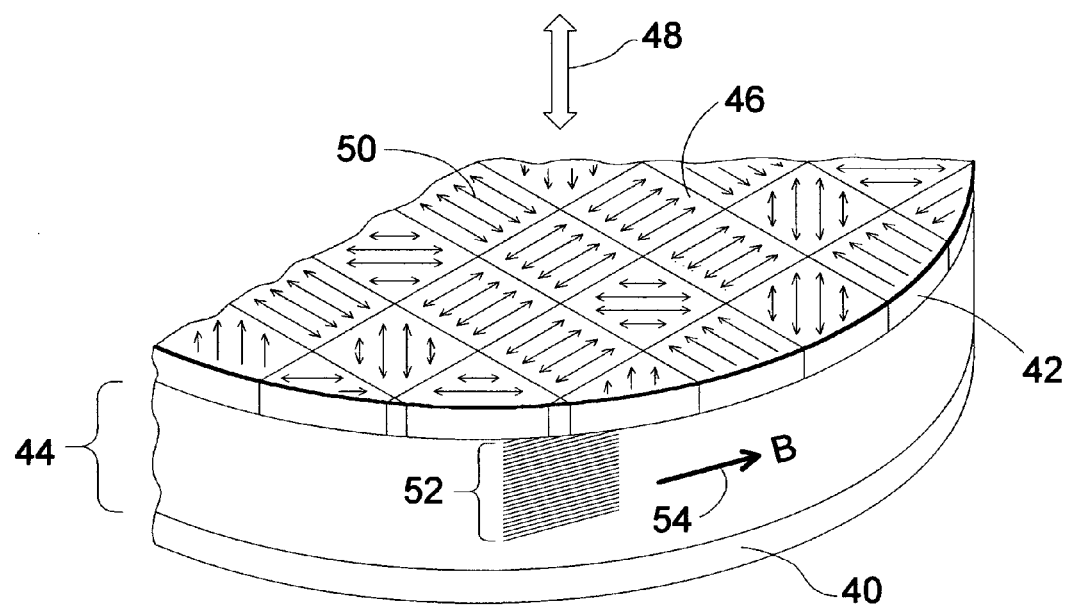
FIG. 2 is a perspective cross section through a magneto-optical LCD employing global rotation of a dichroic liquid crystal and a single polarizer.

Optical structure 22 is similar in appearance and construction to a typical conventional LCD cell that exploits the electro-optical effect. Various embodiments are possible. FIG. 2 illustrates the preferred embodiment, which comprises a reflecting layer 40, a polarizing layer 42, and a center layer 44 filled with a liquid crystal 52 having dichroic (i.e., polarization dependent) absorption properties. Liquid crystal 52 is preferably a calamitic (nematic or smectic) mixture within which a "guest" dichroic dye is dissolved. Discotic liquid crystal molecules may be added to liquid crystal 52 to improve magnetic responsivity. Ferronematic compounds may be employed to enhance magnetic response as well.

Liquid crystal 52 is also weakly anchored to the surfaces of layers 40 and 42 with no preferred orientation. Weak anchoring and a relatively wide spacing (tens of micrometers) between layers 40 and 42 are desirable in order to promote alignment of the director of liquid crystal 52 with an external magnetic field vector 54. Magnetic field vector 54 should have a substantial component aligned in the plane of the liquid crystal cell comprised of layers 40, 42, and 44. Magnetic field vector 54 must be strong enough to overcome the wall anchoring tendencies of liquid crystals (i.e., the Freedericksz effect). While all liquid crystals exhibit the magneto-optical effect as well as the more commonly exploited electro-optical effect, the chosen mixture should have relatively strong magneto-optical properties. Upper layer 42 comprises regions, which may be pixels, 46, each of which possess selectively predetermined light polarizing properties. Regions or pixels 46 linearly polarize natural incident light or block polarized incident linearly polarized light in accordance with polarizer orientation 50. Regions or pixels 46 may be individual polarizers or be a polarizing film applied selectively to a transparent substrate.

Optionally, the ordering of the various layers can be varied. For example, polarizing layer 42 can be replaced by a transparent cover and moved to be in between the liquid crystal layer 44 and reflective layer 40.

Figure 3:
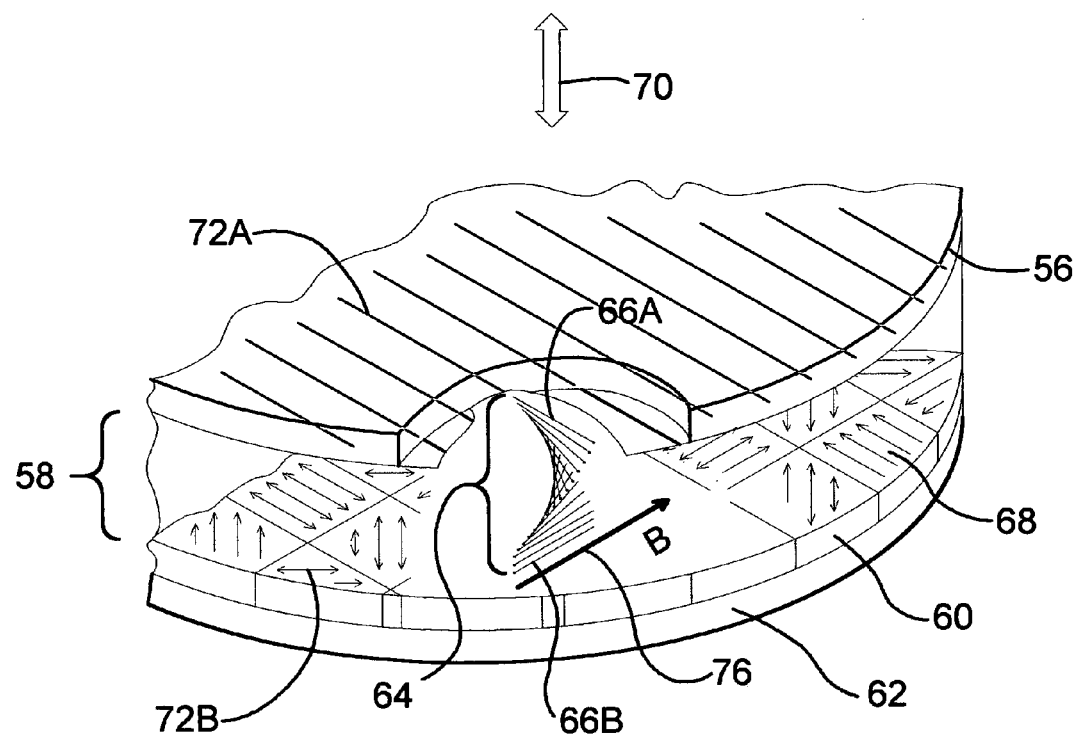
FIG. 3 is a perspective cross section through a magneto-optical LCD employing variably twisting a singly anchored birefringent liquid crystal and dual polarizers.

An alternative embodiment of the liquid crystal display of the invented magneto-optical liquid crystal pressure gauge cell illustrated in FIG. 3 comprises a first linearly polarizing layer 56, a center layer 58 preferably filled with a substantially transparent birefringent calamitic (nematic or smectic) liquid crystal 64, a second linearly polarizing layer 60, and a reflective layer 62. Layer 60 linearly polarizes incident linearly polarized light in accordance with polarizer orientation 72A. Liquid crystal 64 is preferably a mixture capable of rotating the direction of polarization of incident linearly polarized light. Liquid crystal 64 may also incorporate discotic and/or, possibly, chiral liquid crystal components to improve responsivity to magnetic fields. Ferronematic compounds may be employed to enhance magnetic response as well. Liquid crystal 64 is relatively strongly anchored to the inner surface of first polarizing layer 56 so as to have a director 66A substantially aligned at the inner surface of first layer 56 with the orientation of preferred polarized light transmission of first layer 56. Polarizing second layer 60 comprises regions or pixels 68 with predetermined light polarizing properties. Regions or pixels 46 block polarized incident linearly polarized light in accordance with polarizer orientation 72B. Liquid crystal 64 is relatively weakly anchored to the inner surface of second polarizing layer 60 so that a director 66B near the inner surface of layer 60 readily aligns with an applied magnetic field vector 76. Magnetic field vector 76 should have a substantial component aligned in the plane of the liquid crystal cell comprised of layers 56, 58, and 60. Magnetic field vector 76 should be strong enough to overcome liquid crystal director wall anchoring tendencies at the inner surface of second polarizing layer 60 and weak enough to avoid breaking the wall anchor at the inner surface of first polarizing layer 56.

The embodiments described in reference to FIGS. 2 and 3 employ reflecting layers 40 or 62 to permit passive operation using incident light. Reflected incident light is selectively blocked or passed to produce a display. Alternatively, transmissive modes of operation may be employed using artificial light sources whereby reflecting layers 40 or 62 are not included in the layered structures. The display is then seen as changes in light transmission through the layered structure.

Operation

Referring to FIG. 1, the magnetic field 26 in the plane of display unit 4 has a variable orientation with respect to the display unit. Magnetic field 26 may be natural or be produced by a combination one or more permanent or electromagnets (not shown). The position of virtual pointer 24, the markings on dial scale 28, or the value of visible display symbol 30 to change to show the reading as the relative direction of the magnetic field rotates.

Referring to FIG. 2, incident light 48 is polarized selectively in regions or pixels 46 and passes into dichroic liquid crystal layer 44. The polarized light is attenuated in variable degrees according to the difference in angle between the polarization direction and the orientation of the director of dichroic liquid crystal 52, which aligns substantially with applied magnetic field 54. A substantial part of the unattenuated component of light passing through liquid crystal layer 44 is reflected back through liquid crystal layer 44 by reflecting layer 40. Further attenuation of the reflected light will occur within liquid crystal layer 44 before the attenuated and reflected light reemerges from polarizing layer 42. Thus pixel 46 may appear bright or dark under control of the orientation of magnetic field 54.

In the display system shown in FIG. 3, incident light 70 is linearly polarized by first layer 56 and passes into liquid crystal layer 58. The orientation of the linear polarization of the light entering liquid crystal layer 58 is rotated by the helical twist of the liquid crystal director 64. The helical twist is produced by torque resulting from anchoring director 66A to the inner surface of layer 56 and the forces produced by external magnetic field 76 on the liquid crystal layer 58. Director 66B at the inner surface of layer 60 is weakly anchored to layer 60 so that most of the span of liquid crystal layer 58 readily aligns with magnetic field 76. Note that the twist of the liquid crystal director 64 need not be uniform across the span of layer 58. The pixels 68 comprising second polarizing layer 60 selectively attenuate the polarized light passed by liquid crystal layer 58 in accordance with the degree of helical twist and the particular linear polarization orientation of the individual pixels 68. Light transmitted by the second polarizing layer 60 is then reflected back through that polarizing layer by reflecting layer 62 and is further attenuated. Reflected light emanating from second polarization layer 60 is transmitted back through liquid crystal layer 58 and first polarizing layer 56 to an observer. Thus pixel 68 may appear bright or dark based upon the orientation of magnetic field 76.

CONCLUSIONS, RAMIFICATIONS, AND SCOPE

It can be seen that I have invented a liquid crystal display scheme that responds globally a vector sum of externally provided magnetic fields where the relative orientation of the sum magnetic filed selectively alters light polarization properties of pixels to form images. External magnetic fields may be provided by combinations of permanent magnets, electromagnets, and natural magnetic fields. The strengths and directions of these external provided magnetic fields may further be controlled by varying the orientation or positions of permanent magnets and electromagnets and by controlling the current(s) through any electromagnet(s).

Accordingly, it can also be seen that I have invented a convenient, easily visible, passive, robust, compact, flexible, accurate, and economical means for displaying magnetic field direction and the values of quantities that may be used to control or may be related to magnetic field direction, including vehicular tire pressure. Vehicular safety can be enhanced because tire pressure can be visually quickly and cleanly checked without need of attaching/detaching any external devices.

It can also be seen that I have invented a flexible and passive magnetic compass, which may be attached or bonded to charts and maps to provide permanent means for geographical orientation. Biasing the magneto-optic liquid crystal display with one or more permanent magnets can provided enhanced compass performance.

It can further be seen that I have invented an analog gauge with no moving parts. For example, an analog ammeter may be constructed by passing current through a wire near the invented magneto-optic liquid crystal display. Additionally, this ammeter may also passively digitize and display current digitally.

Although the description above contains some specificity, it should not be construed as limiting the scope of the invention but as merely providing illustrations of the scope of this invention: namely utilizing of the magneto-optic properties of liquid crystals in combination with a magnetic field that changes direction responsive to a changing analog signal or parameter, to provide a passive visual indication of the change in the signal or parameter.

Various other embodiments and ramifications are possible within scope the basic invention as described above. For example, materials other than liquid crystals such as ferrofluids demonstrate a type of response to magnetic field direction as liquid crystals and have the potential to provide comparable types of passive displays.

Also there are many different mechanisms capable of varying direction or rotating a magnetic field transducing mechanical stimulus, including pressure. Furthermore, flux-guiding means, including additives to the liquid crystal material, may be employed to increase the coupling of the tangential magnetic field within the display. More complex layered structures may be enhance the quality as well as color of the visual effects magnetic field direction has on pixels making up the display including multiple polarizing and liquid crystal layers.

The references listed below present useful teachings to those wishing to become familiar with and more skilled in fields of magneto-optic effects of liquid crystal compositions and analogous materials:

*Liquid Crystals, 2nd Ed.*, S. Chandrasekhar, Cambridge University Press, 1992.

*Introduction to Liquid Crystals—Chemistry and Physics*, P. J. Collings and M. Hird, Taylor and Francis, 1998.

*Liquid Crystal Devices: Physics and Applications*, V. G. Chigrinov, Artech House, 1999.

"*Ferronematics: Enhanced Magneto-Optical Response of a Liquid Crystalline Systems*," Burylov, S. V. and Y. L. Raikher, *Mat. Sci. Eng. C2* (1995) 235–241.

"*Static And Dynamic Behaviour of Ferronematics Under Magnetic Fields*," Motoc, C., and E. Petrescu, *Modern Phys Lett. B.*, 12, No 13 (1998) 529–540.

"*Magnetic Field Controlled Optical Phase Retardation in a Hybrid Nematic Cell*," P. Ziherl, D. Subacius, A. Strigazzi, V. M. Pergamenshchik, A. L. Alexe-Ionescu, O. D. Lavrentovich, and S. Zumer, *Liquid Crystals*, 24, no. 4 (1998) 607–612.

Definitions of cholesteric helix and pitch length and methods of its measurement, are known to those skilled in the art such as can be found in *Electro-optical and Magneto-Optical Properties of Liquid Crystals*, Blinov, L. M., John Wiley & Sons Ltd. 1983. The pitch length is modified by adjusting the concentration of the chiral material in the liquid crystal composition. For most concentrations of chiral dopants, the pitch length induced by the dopant is inversely proportional to the concentration of the dopant.

Thus the scope of the invention should be determined with respect to the appended claims and equivalents, rather than by the examples described above.

I claim:

1. A method for displaying a magnetic field direction comprising:
   a. providing a magnetic field having a particular direction;
   b. locating a magneto-optical cell within the provided magnetic field;
   c. providing a source of light for transmission through the magneto-optical cell;
   d. measuring light transmission properties of the magneto-optical cell in relation to changes in the direction the provided magnetic field relative to the orientation of the magneto-optical cell.

2. The method as recited in claim 1 wherein the magneto-optical cell comprises one or more layers with walls.

3. The method as recited in claim 2 wherein a cell wall has light transparency properties.

4. The method as recited in claim 2 wherein a cell wall has light reflecting properties.

5. The method as recited in claim 2 wherein a cell wall has light polarizing properties.

6. The method as recited in claim 2 wherein a cell wall has the property of anchoring a liquid crystal director.

7. The method as recited in claim 1 wherein the magneto-optical cell contains a magneto-optical material.

8. The method as recited in claim 7 wherein the magneto-optical material is a liquid crystal having dichroic (polarization dependent) light absorption properties.

9. The method as recited in claim 7 wherein the magneto-optical material comprises types of liquid crystal materials classified as smectic and nematic.

10. The method as recited in claim 9 wherein the magneto-optical material further includes properties of classes described as discotic and chiral.

11. The method as recited in claim 9 wherein the magneto-optical material further includes ferronematic materials.

12. The method according to claim 2 wherein at least one layer of the magneto-optical cell provides:
   i. a display composed of one or more oriented pixel elements; and further including a step of:
   ii. orienting each pixel element within the display to control the light transmission properties of each pixel in accordance with the relative orientation of each pixel to the direction of the provided magnetic field.

13. The method according to claim 12 and further including the steps of:
   iii. orienting each pixel element within the display for providing at least one visual image relative to coordinates of the display;
   iv. successively varying the direction of the provided magnetic field relative to the orientation of the display for producing successive visual images.

14. The method according to claim 2 wherein at least one layer wall surface of the magneto-optical cell provides:
   i. a display composed of one or more oriented pixel elements; and further including a step of:
   ii. orienting each pixel element within the display to control the light transmission properties of each pixel in accordance with the relative orientation of each pixel to the direction of the provided magnetic field.

15. The method according to claim 14 and further including the steps of:
   iii. orienting each pixel element within the display for providing at least one visual image relative to coordinates of the display;
   iv. successively varying the direction of the provided magnetic field relative to the orientation of the display for producing successive visual images.

16. A method or displaying a magnetic field direction comprising:
   a. providing a magnetic field having a particular direction;
   b. locating a magneto-optical cell containing a magneto-optical material within the provided magnetic field;

c. providing a source of light for transmission through the magneto-optical cell;
d. measuring light transmission properties of the magneto-optical cell in relation to changes in the direction the provided magnetic field relative to the orientation of the magneto-optical cell;
e. polarizing light entering the magneto-optical material in a first direction with a first polarizer; and
f. polarizing light transmitted by the magneto-optical material in a second direction with a second polarizer, wherein light transmitted by the second polarizer provides an observable bright field.

17. A method for displaying a magnetic field direction comprising:
a. providing a magnetic field having a particular direction;
b. locating a magneto-optical cell containing a magneto-optical material within the provided magnetic field;
c. providing a source of light for transmission through the magneto-optical cell;
d. measuring light transmission properties of the magneto-optical cell in relation to changes in the direction the provided magnetic field relative to the orientation of the magneto-optical cell;
e. polarizing light entering the magneto-optical material in a first direction with a first polarizer; and
f. reflecting light transmitted by the magneto-optical material back through the magneto-optical material and first polarizer wherein reflected light transmitted provides an observable bright field.

* * * * *